UNITED STATES PATENT OFFICE.

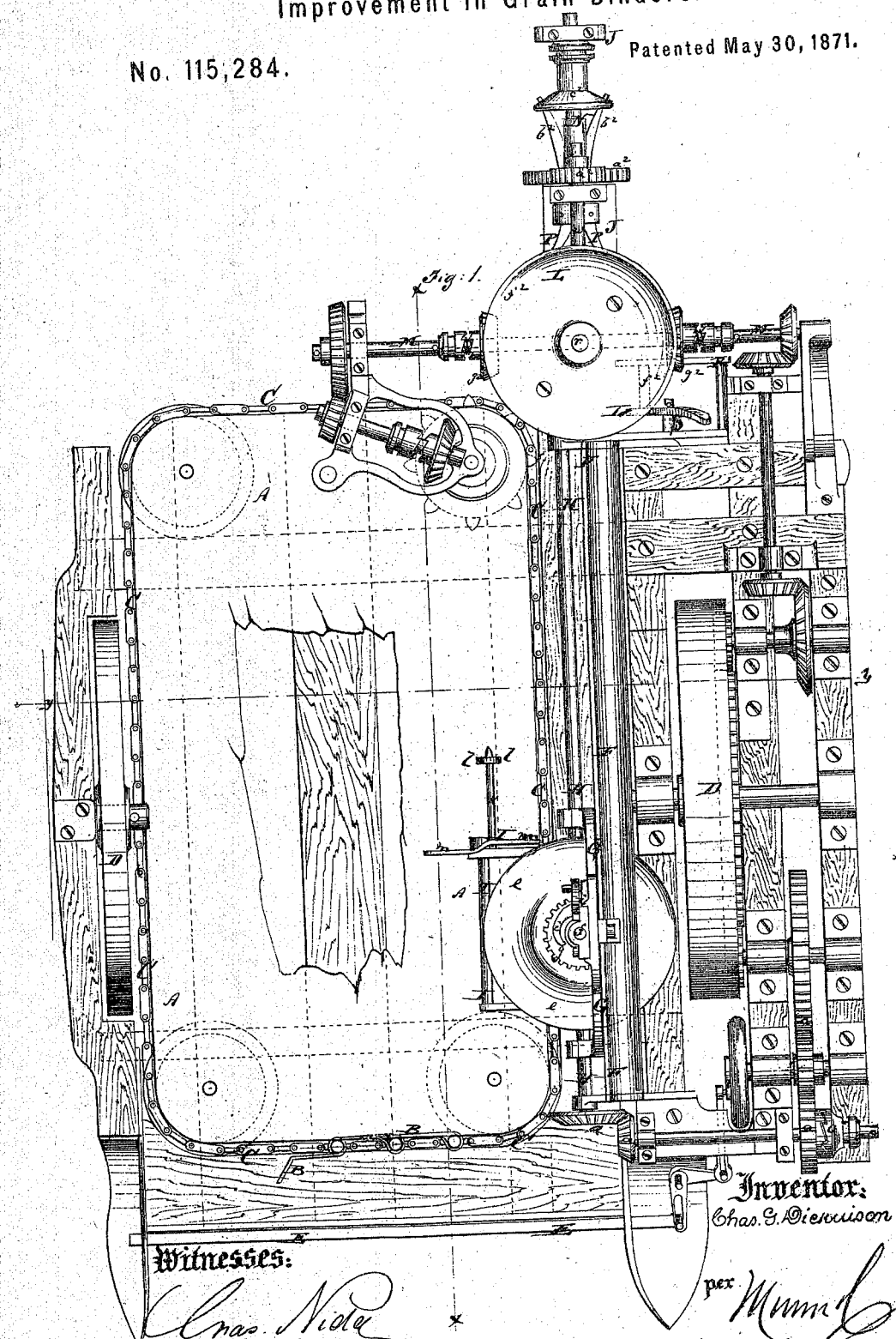

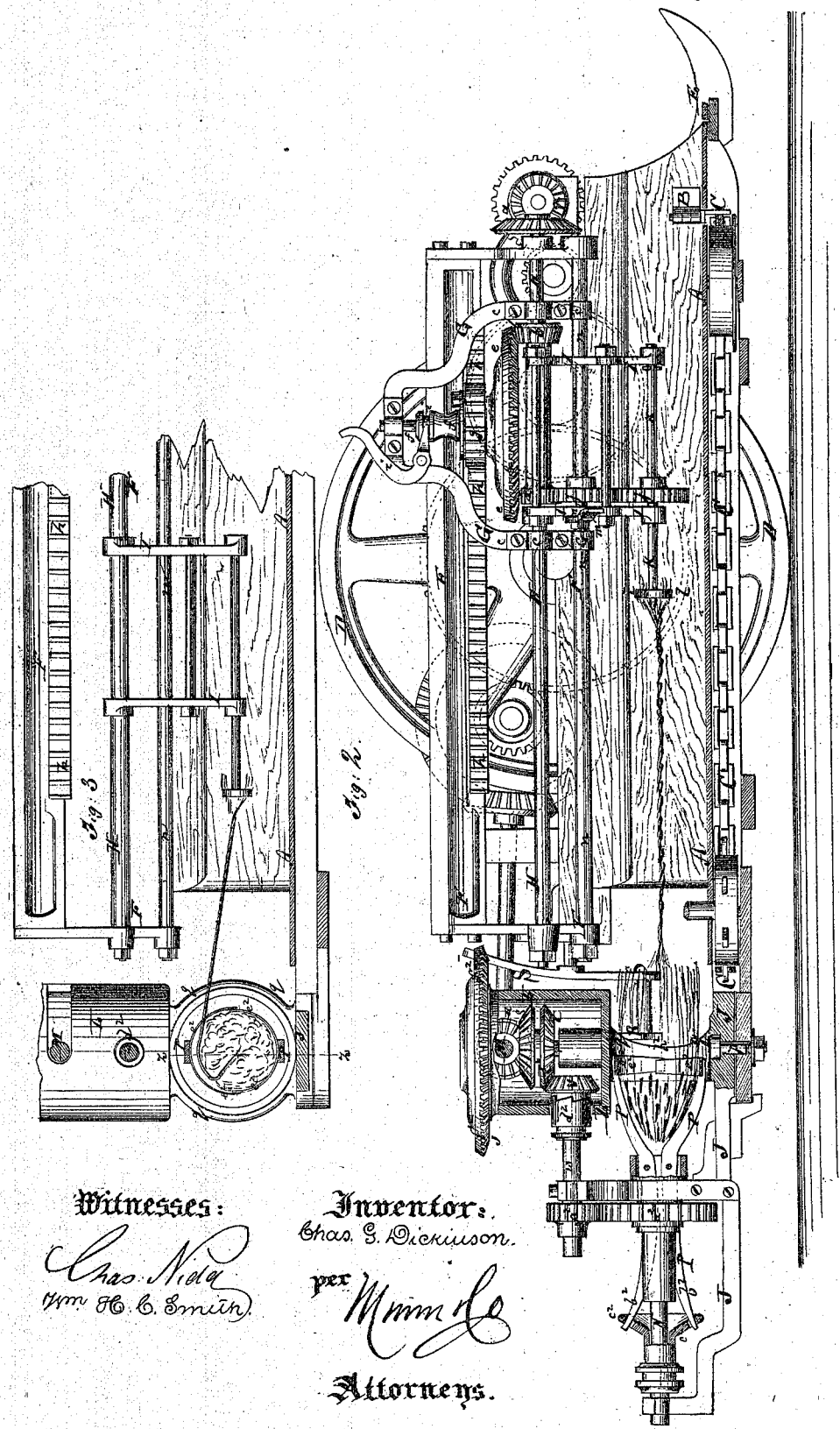

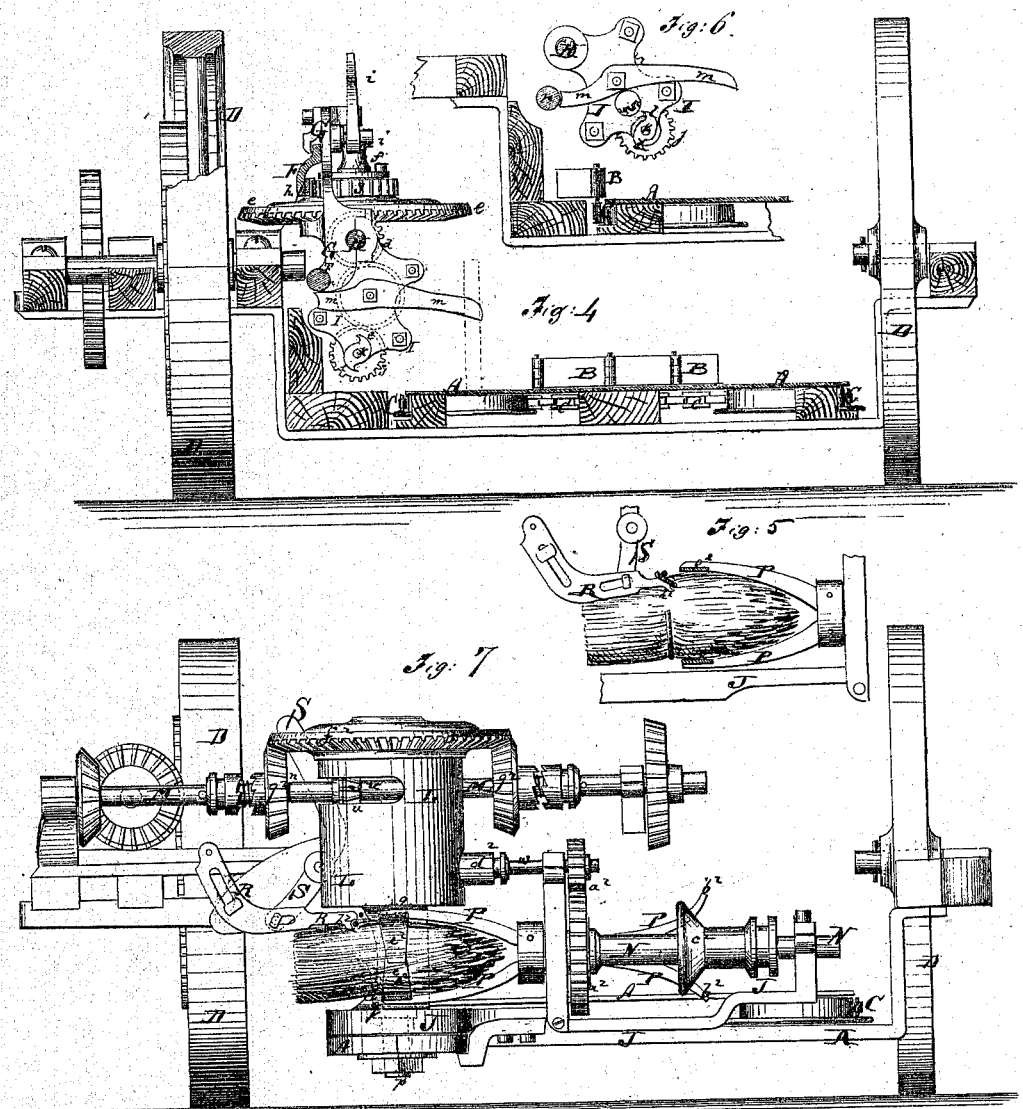

CHARLES G. DICKINSON, OF POUGHKEEPSIE, NEW YORK.

IMPROVEMENT IN GRAIN-BINDERS.

Specification forming part of Letters Patent No. 115,284, dated May 30, 1871.

*To all whom it may concern:*

Be it known that I, CHARLES G. DICKINSON, of Poughkeepsie, in the county of Dutchess and State of New York, have invented a new and Improved Grain-Binder Attachment to Harvesters; and I do hereby declare that the following is a full, clear, and exact description thereof, which will enable others skilled in the art to make and use the same, reference being had to the accompanying drawing forming part of this specification, in which—

Figure 1 represents a plan or top view of a harvester provided with my improved grain-binder attachment. Fig. 2 is a vertical longitudinal section of the same taken on the plane of the line $x\,x$, Fig. 1. Fig. 3 is a longitudinal section on the same plane, showing the parts in a different position. Fig. 4 is a vertical transverse section of the same taken on the plane of the line $y\,y$, Fig. 1. Fig. 5 is a detail transverse section of the same taken on the plane of the line $z\,z$, Fig. 3. Fig. 6 is a detail transverse section on the same plane as Fig. 4, showing the twister in a different position. Fig. 7 is a rear elevation of the machine.

Similar letters of reference indicate corresponding parts.

This invention relates to a new attachment for binding grain on the harvester immediately after it has been cut, and without any more attention than is necessary to throw the twisting and binding mechanism into and out of gear. The invention consists in the use of a band gatherer and twister, which takes the straw from the sheaf and forms it into a band. This twister is a sliding carriage, which, by and during its longitudinal movement, first pulls the straw from the sheaf and then feeds it back during the winding of the band around the sheaf. The twister contains a rotary shaft which twists the straw into the band while pulling it from the sheaf. The invention consists, also, in the arrangement of a pivoted cradle in which the sheaf is deposited during the entire band making and winding operation. This cradle holds the sheaf in line with the shaft of the twister while the band is being made, and carries it at right angles thereto to let the band be wound around the sheaf. The cradle is provided with a claw-frame or pair of tongs for retaining and finally releasing the sheaf.

A in the drawing represents the rake-platform of a harvester, of suitable construction, in which a rake, B, working on an endless band or chain, C, or by other means, is arranged. The harvester rests on driving-wheels D D, and has suitable cutter and finger bars, and mechanism for operating and adjusting the same. The position of the sickle is indicated at E in Figs. 1 and 2. F is a longitudinal horizontal frame, supported on the side of the platform A for the purpose of holding and guiding the sliding carriage G, and being the track for the same. A horizontal shaft, H, is also hung lengthwise in the frame F, and connected by gearing $a\,a$ with the driving mechanism. A bevel-pinion, $b$, is fitted upon the shaft H so that it can slide thereon, but connected with it by groove and feather, or otherwise, so as to be revolved by the shaft while it slides on it. The carriage G is, with two pendent arms, $c\,c$, fitted over the shaft H. Between these arms are hung to the shaft the aforesaid pinion $b$, and also a pendent frame, I, and a pinion, $d$, between the arms of the frame I. This pinion $d$ is, like $b$, loose on the shaft to slide, but connected to revolve with it. The pinion $b$ meshes into the teeth of a bevel-gear wheel, $e$, mounted upon a vertical shaft, $f$, that hangs in the carriage G. Loose on said shaft $f$ is a pinion, $g$, meshing into the teeth of a horizontal rack, $h$, which constitutes part of the frame F. Whenever, by means of a clutch, $i$, on the shaft $f$, the pinion $g$ is thrown into gear, it will, by its connection $e\,b$ with the shaft H, be revolved and roll on the rack, imparting longitudinal motion to the carriage G. The pinion $d$ is, by suitable intermediate gearing $j$, connected with a horizontal shaft, $k$, hung in the pendent frame I. Whenever the shaft H revolves, the shaft $k$ will also be rotated, no matter whether the frame I is swung up or down. The rear end of the shaft $k$ carries a set of hooks, $l\,l$, or equivalent projections, for twisting the straw which may be attached to it. The pendent frame I is either suspended from the shaft H, as in Fig. 4, in which case the shaft $k$ is nearly vertically below H, or it is swung to one side, as in Fig. 6, and held so by a lever, $m$, fitting against a horizontal rail, $n$, of the frame F. When the lever $m$ is tripped to get off the rail $n$, the frame I will drop into the position shown in Fig. 4. The sliding carriage G, together with the pendent frame I, constitutes the band drawer and twister. The apparatus for moving the said carriage and working the twister-shaft k is thrown into or out of gear by means of a clutch, o, in the gearing a. To the rear end of the platform A, and about in line with the frame F, is pivoted, at p, a horizontal plate, J, which constitutes the bed or support for the cradle or sheaf-holder. This plate can be swung to be in a longitudinal position, as in Fig. 1, or lateral, as in Fig. 7. Above the pivot p is affixed to the plate J a vertical ring, q, and above the same a turret, L, surrounding an upright shaft, r, which is in line with the pivot p. The upright shaft r carries bevel-wheels s t, as shown in Fig. 2. The upper bevel-wheel s meshes into a similar wheel, u, which is mounted upon a horizontal shaft, M, hanging in the frame of the harvester proper. The lower wheel t meshes into a similar bevel-wheel, v, which is on a horizontal shaft, w, having its bearings in the plate J. A clutch, $d^2$, can be used to throw the wheel v in gear with t. By gear-wheels $a^2$ $a^2$ the shaft w is connected with another horizontal shaft, N, below, whose bearings are also on the plate J. The shaft N is in line with the center of the ring q, and holds a pair of jaws, P P, which extend into said ring, holding curved clasps $e^2$ within the same. The shanks $b^2$ of the jaws P are fitted into a slide, $c^2$, by means of which they can be opened or closed at will. The turret L has a bevel-wheel, $f^2$, at its upper end. Bevel-wheels $g^2$ $g^2$ on the shaft M can be thrown in gear with the wheel $f^2$ whenever the turret, and with it the plate J, is to be turned. When the wheels $g^2$ are not in gear, but the shaft M is rotated by suitable connection with the main driving-gear of the harvester, and the wheels v t are together, the motion of the shaft M is transmitted to the shaft N and jaws P.

The operation of the binding attachment is as follows: The grain, enough for one sheaf, is by the rake B swept into the cradle while the same is in line with the frame F, as in Figs. 1 and 2, so that such grain will be held between the jaws P in the clasps $e^2$. The carriage G, which is at the rear end of the frame F, is now thrown in action by the clutch o, so that it will move forward on the rack h; but before so moving the pendent frame I, hanging as in Fig. 4, has the end of the shaft k inserted in the butt end of the sheaf and revolved, so that the hooks l will gather some straw. As the carriage is moved ahead the twisters l continue to revolve and to draw straw from the center of the sheaf, twisting the same into a band. When the carriage has moved far enough to make a band of the requisite length, the clutch i strikes a suitable stop and is thrown out of gear to release the pinion g and arrest the longitudinal motion of the carriage G. The wheels $g^2$ are now thrown in gear with $f^2$ so as to turn the turret L, and with it the plate J and entire cradle, with the sheaf at right angles to the frame G, as in Figs. 3, 5, and 7. The pendent frame I is, by suitable mechanism, also swung up into the position shown in Fig. 6, and held so by the lever m. The shaft k, holding the band, is thereby thrown higher and in proper line with the middle of the sheaf. The clutch $d^2$ is next moved to throw the shafts w and N into gear and have them revolved. Thereby the sheaf is revolved and winds the band around it, pulling the carriage G and pendent frame back by so winding. When the band has been entirely wound upon the sheaf, its end is tucked under by the tucker R, shown in Fig. 5. This is a slotted plate, connected with a lever, S, and arranged on the back end of the machine to be above the butt end of the revolving sheaf. When the lever S is swung, the end of the tucker forming a claw, as at $h^2$, for embracing the band, is carried down and ahead, and tucks the end of the band into the sheaf. The slide $c^2$ is next moved to open the jaws and discharge the sheaf. The cradle is now again swung in line with the frame G to receive grain for another sheaf, and the lever m is tripped to drop the shaft k in line with the center of the cradle for forming another band.

Having thus described my invention, I claim as new and desire to secure by Letters Patent—

1. The band gatherer and twister, consisting of the reciprocating carriage G, pendent frame I, shaft k, and retaining-fingers l l, all constructed and operating substantially as set forth.

2. The pivoted cradle J and rotating jaws P P, when these parts are constructed and operated substantially as and for the purpose described.

3. The grain-binding attachment, composed of carriage and twister G I, cradle and rotating holder J P, and tucker R, all combined, constructed, and operating as and for the purpose specified.

CHARLES G. DICKINSON.

Witnesses:
 CHAS. H. DAVIS, Jr.,
 C. PIERRE ABEL.